(12) United States Patent
Moran

(10) Patent No.: US 6,764,228 B2
(45) Date of Patent: Jul. 20, 2004

(54) OUTGAS PREVENTION IN ELECTROOPTICAL PACKAGES

(75) Inventor: Joseph M. Moran, Berkeley Heights, NJ (US)

(73) Assignee: Veritech, Inc., Whippany, NJ (US)

( * ) Notice: Subject to any disclaimer, the term of this patent is extended or adjusted under 35 U.S.C. 154(b) by 216 days.

(21) Appl. No.: 10/071,141

(22) Filed: Feb. 7, 2002

(65) Prior Publication Data
US 2003/0147603 A1 Aug. 7, 2003

(51) Int. Cl.[7] .......................... G02B 6/36; H01L 23/28; H01R 13/52
(52) U.S. Cl. .................. 385/94; 385/116; 257/787; 439/271; 439/933; 156/325
(58) Field of Search .................... 385/94, 116; 257/99, 257/100, 433, 729, 787–796, 684, 678, 687, 701–703; 439/271–277, 935, 936, 933; 200/302.1; 756/325–338

(56) References Cited

U.S. PATENT DOCUMENTS

| 3,721,948 A | * | 3/1973 | Brandt et al. ............ 439/695 |
| 3,845,260 A | * | 10/1974 | Lohr ..................... 200/83 N |
| 3,987,300 A | | 10/1976 | Palmer ................... 250/227 |
| 5,157,753 A | | 10/1992 | Rogers, Jr. .............. 385/115 |
| 5,250,843 A | | 10/1993 | Eichelberger ........... 257/692 |
| 5,566,262 A | * | 10/1996 | Yamane et al. ............ 385/33 |
| 5,598,496 A | | 1/1997 | Anderson et al. .......... 385/84 |
| 5,613,031 A | * | 3/1997 | Tanabe et al. ........... 385/138 |
| 5,641,713 A | | 6/1997 | Kyle ..................... 156/330 |
| 5,727,105 A | * | 3/1998 | Nagata et al. ............ 385/94 |
| 5,778,125 A | | 7/1998 | Busse et al. ............. 385/80 |
| 5,866,263 A | | 2/1999 | Hogan et al. ............ 428/457 |
| 6,282,349 B1 | | 8/2001 | Griffin .................... 385/81 |
| 6,400,875 B1 | * | 6/2002 | Lincoln et al. .......... 385/115 |

FOREIGN PATENT DOCUMENTS

JP   58-158611   *   9/1983   ................. 385/116

* cited by examiner

Primary Examiner—Edward J. Glick
Assistant Examiner—Krystyna Suchecki
(74) Attorney, Agent, or Firm—Irwin Ostroff; Erwin W. Pfeifle

(57) ABSTRACT

A hermetic package having connectors, such as optical fibers or electrical leads, connected and bonded thereto with a bonding material such as epoxy resin, has the bonding material coated with a single layer or multiple layers of sealing material, such as chromium, copper, gold, tungsten, titanium, nickel, or aluminum, to prevent outgased material from the bonding material from entering the hermetic package enclosure. The bonding material may be recessed prior to coating of the sealing material to permit the sealing material to be polished from the optical element and the optical element polished flush with the inside of the package while leaving the sealing material covering the bonding material.

7 Claims, 2 Drawing Sheets

OUTGAS PREVENTION IN ELECTROOPTICAL PACKAGES

CROSS-REFERENCE TO RELATED APPLICATIONS

This application is related to application Ser. No. 09/739,045, filed Dec. 18, 2000, and to Ser. No. filed Dec. 31, 2001, and entitled "Optical Fiber Array And Method Of Formation". All three applications have the same inventor and assignee.

FIELD OF THE INVENTION

This invention relates to sealing of a housing, such as optoelectronic packaging, in a manner to restrain material given off by sealants used in the housing from contaminating the interior of the package, and more particularly, to sealing of an optical passage, such as a window or optical fiber, within a hermetic package in a manner to limit materials given off by sealants such as organic adhesives from access to the interior of the hermetic package.

BACKGROUND OF THE INVENTION

Many optical applications that require the use of adhesives (bonding materials) to adhere (bond) elements to some type of holder may require hermetic sealing of the device. Using adhesives such as epoxy can present problems with hermetic seals because the adhesives can outgas such things as water and components, such as solvents. As a result, it is highly desirable to seal the exposed adhesive surface to prevent outgasing of any adhesive components.

For example, optical fibers may be threaded through a precision opening (aperture) in a support member (substrate) that is, or is intended to be, part of a hermetically sealed package. It is convenient in such a situation to seal the fiber to the sides of the opening using an adhesive, such as epoxy. Unfortunately, this results in exposed adhesive within the intended hermetic package. Since many adhesives, such as epoxy, outgas, or give off undesirable materials such as water or solvents, this may result in contamination of the interior of the hermetic package with the resulting outgased materials.

The prior art has been aware of the problem of outgasing from organic adhesives into hermetic enclosures, but the usual solution is to either avoid adhesives prone to outgasing entirely, or at least attempt to reduce the outgasing, or to remove the products of outgasing after sealing the hermetic container.

SUMMARY OF THE INVENTION

From a first apparatus aspect, the present invention is a packaging member for forming at least part of a hermetic package having a portion thereof for forming an interior surface of a hermetic package and having at least one side wall which at least partly defines an opening therethrough. The packaging member comprises an optical element passing through the opening in the packaging member, bonding material, and a layer of sealing material. The bonding material bonds the optical element to at least a portion of the one side wall of the packaging member and has a surface adjacent the portion of the housing member for forming an interior surface. The bonding material is prone to emission of undesirable components into the interior of the hermetic package. The layer of sealing material covers the surface of the bonding material adjacent the portion of the housing member. The layer of sealing material is one which is not prone to emission of undesirable components and which limits undesirable components emitted from the bonding material from entering the interior of the hermetic package.

From a second apparatus aspect, the invention is an array apparatus which comprises a substrate, N elements, a bonding material, and a layer of sealing material. The substrate is capable of supporting an array of N spaced-apart elements and has first and second opposing surfaces and defines a plurality of N substrate apertures which each extend therethrough from the first surface to the second surface with a cross-section of each of the N substrate apertures being greater than a cross-section of an element such that one element can be passed through in each of the N primary substrate apertures. Each one of the N elements has an end that passes through one of the N spaced-apart apertures in the substrate with the end extending sufficiently through an aperture in the substrate to have a surface that is at least essentially common with the second surface of the substrate. The bonding material is located in each aperture in the substrate and bonds each element to the substrate. The bonding material has a surface adjacent the second surface of the substrate and is prone to emission of undesirable components through the adjacent surface. The layer of sealing material covers the adjacent surface of the bonding material. The sealing material is one which is not prone to emitting undesirable components and which limits the emission of undesirable components from the bonding material from passing therethrough.

From a third apparatus aspect, the present invention is an optical fiber array apparatus which comprises a substrate, N optical fibers, a bonding material, and a layer of sealing material. The substrate is capable of supporting an array of N spaced-apart optical fibers and has first and second opposing surfaces and defines a plurality of N substrate apertures which each extend therethrough from the first surface to the second surface with a cross-section of each of the N substrate apertures being greater than a cross-section of an optical fiber such that one optical fiber can be passed through in each of the N substrate apertures. Each one of the N optical fibers has an end that passes through one of the N spaced-apart apertures in the substrate with the end extending sufficiently through an aperture in the substrate to have a surface that is at least essentially common with the second surface of the substrate; The bonding material is located in each aperture in the substrate and bonding each optical fiber to the substrate. The bonding material has a surface adjacent the second surface of the substrate and is prone to emission of undesirable components through the adjacent surface. The layer of sealing material covers the adjacent surface of the bonding material. The sealing material is one that is not prone to emitting undesirable components and which limits the emitted undesirable components from the bonding material from passing therethrough.

From a fourth apparatus aspect, the invention is a hermetic package which comprises a packaging member, an optical element, a bonding material, a layer of sealing material, and an additional member. The packaging member forms at least part of a hermetic package and has a portion thereof for forming an interior surface of a hermetic package. The packaging member defines an opening extending there through. The optical element passes through the opening in the packaging member. The bonding material bonds the optical element to the packaging member. The bonding material has a surface adjacent the portion of the housing member for forming an interior surface. The bonding material is prone to emission of undesirable components into the interior of the hermetic package. The layer of sealing material is on and covers the surface of the bonding material adjacent the portion of the housing member. The layer of sealing material is not prone to emitting undesirable components and limits undesirable components emitted by the bonding material from entering the interior of the hermetic package. The additional member is attached to the packaging member to form a complete hermetically sealed package.

From a fifth apparatus aspect, the invention is a packaging member which has a portion thereof for forming an interior surface of a hermetic package and which defines an opening therethrough. The packaging member comprises an optical fiber passing through the opening in the packaging member, epoxy resin bonding material, and a layer of sealing material. The epoxy resin bonding material bonds the optical element to the packaging member. The epoxy resin bonding material has a surface adjacent the portion of the housing member for forming an interior surface. The bonding material is prone to emission of undesirable components into the interior of the hermetic package. The layer of a sealing material is on and covers the surface of the bonding material adjacent the portion of the housing member. The sealing material is one which limits emission of undesirable components into an interior of a hermetic package of which the packaging member forms a part. The layer of sealing material limits undesirable components emitted by the bonding material from entering the interior of the hermetic package and is selected from the group consisting of chromium, copper, gold, tungsten, titanium, nickel, and aluminum, and has a thickness of about 0.03 microns or greater.

From a sixth apparatus aspect, the invention is a packaging member, which forms at least part of a hermetic package, has side walls which define an opening therethrough, and has a portion thereof for forming an interior surface of the hermetic package. The packaging member comprises a connector element passing through the opening in the packaging member, a bonding material, and a layer of sealing material. The bonding material bonds the connector element to the side walls which define the opening. The bonding material has a surface adjacent the portion of the housing member for forming an interior surface. The bonding material is prone to emission of undesirable components into the interior of hermetic package. The layer of sealing material is on and covering the surface of the bonding material adjacent the portion of the housing member. The layer of sealing material is not prone to emitting undesirable components and limits undesirable components emitted by the bonding material from entering the interior of the hermetic package.

From a first method aspect, the invention is a process of sealing an optical element bonded to a support member using bonding material. The method comprises the steps of: placing an optical element through an opening in the support member with the cross-section of the opening being greater than the cross-section of the optical element and with the optical element projecting beyond the support member; filling a space between the optical element and the support member with a bonding material which is prone to emit undesirable components; coating the bonding material and the projecting portion of the optical element with a layer of material which is not prone to emitting undesirable components and which limits passage of any undesirable components emitted by the bonding material; and removing that portion of the layer of material which coats the projecting portion of the optical element while leaving that portion of the layer of material which coats the bonding material intact.

From a seventh apparatus aspect the invention is a packaging member that forms at least part of a hermetic package that defines an opening therethrough and has a portion thereof for forming an interior surface of the hermetic package. The packaging member comprises a connector element passing through the opening in the packaging member, a bonding material, and a layer of sealing material. The bonding material bonds the connector element to the packaging member. The bonding material has a surface adjacent the portion of the packaging member for forming an interior surface The bonding material is prone to emission of undesirable components into the interior of the hermetic package. The layer of a sealing material is on and covers the surface of the bonding material adjacent the portion of the housing member. The layer of sealing material is not prone to emitting undesirable components and limits undesirable components emitted by the bonding material from entering the interior of the hermetic package.

From a second method aspect, the invention is a process of sealing an optical fiber bonded to a support member with epoxy resin bonding material. The method comprises the steps of: placing an optical fiber through an opening in the support member which has a cross-section which is greater than the cross-section of the optical fiber such that there is a space between the optical fiber and the support member, and the optical fiber projects beyond a surface of the support member; filling the space between the optical fiber and the support member with an epoxy resin bonding material which is prone to emit undesirable components; removing a portion of the epoxy resin bonding material so as to leave the bonding material recessed below the surface of the support member; coating the epoxy resin bonding material and the projecting portion of the optical fiber with a layer of material which layer limits passage of any undesirable components emitted by the epoxy resin bonding material; and removing that portion of the layer of material which coats the projecting portion of the optical fiber while leaving that portion of the layer of material which coats the bonding material intact and also removing the projecting portion of the optical element to leave the optical element flush with the surface of the support member.

From a third method aspect, the invention is a process of sealing an element to a support member using bonding material. The method comprises the steps of: placing an element through an opening in the support member with the cross-section of the opening being greater than the cross-section of the element and with the element projecting beyond the support member; filling a space between the element and the support member with a bonding material which is prone to emit undesirable components; coating the bonding material and the projecting portion of the element with a layer of sealing material which is not prone to emitting undesirable components and which limits passage of any undesirable components emitted by the bonding material; and removing that portion of the layer of sealing material which coats the projecting portion of the element while leaving that portion of the layer of sealing material which coats the bonding material essentially intact.

From a fourth method aspect, the invention is process of sealing an element bonded to a support member using epoxy resin bonding material. The method comprises the steps of: placing an element through an opening in the support member which has a cross-section which is greater than the cross-section of the element such that there is a space between the element and the support member, and the element projects beyond a surface of the support member; filling the space between the element and the support member with an epoxy resin bonding material which is prone to emit undesirable components; removing a portion of the epoxy resin bonding material so as to leave the bonding material recessed below the surface of the support member; coating the epoxy resin bonding material and the projecting portion of the element with a layer of sealing material which is not prone to emitting undesirable components and which limits passage of any undesirable components emitted by the epoxy resin bonding material; and removing that portion of the layer of sealing material which coats the projecting portion of the element while leaving that portion of the layer of sealing material which coats the bonding material essentially intact and also removing the projecting portion of the element to leave the element flush with the surface of the support member.

The invention will be better understood from the following more detailed description taken in conjunction with the accompanying drawings and claims.

The drawings may not necessarily be to scale.

DETAILED DESCRIPTION OF THE INVENTION

The present invention avoids or limits the problem of outgasing from adhesive bonding materials into the interior of a hermetically sealed package by covering portions of adhesive bonding materials that would be exposed to the interior of the package with a layer of material which blocks passage of the outgased components into the interior of the package.

Figure 1:
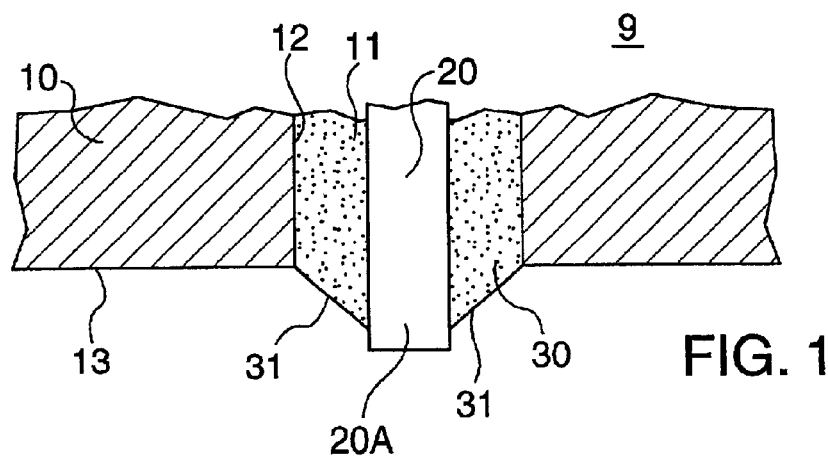
FIG. 1 shows a cross-sectional view of a portion of an optical fiber array.
Figure 6:
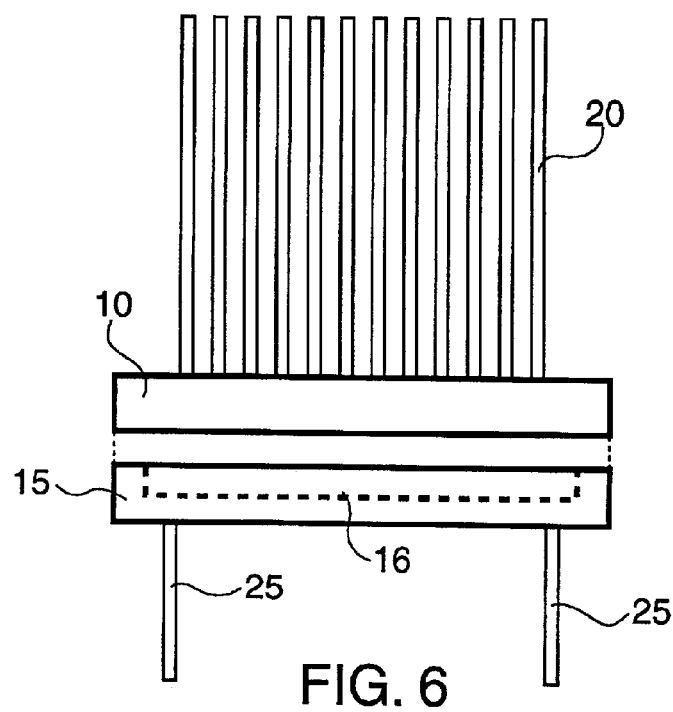
FIG. 6 shows a complete hermetic package using the present invention.

FIG. 1 shows a cross-sectional view of a portion of an optical fiber array 9 comprising a packaging member (support member, substrate) 10 which may be used as part of a hermetic package. Member 10 defines an opening (aperture) 11 through which an element, in this case optical fiber 20, has been threaded. While only one opening 11 and one optical fiber 20 are shown, it is to be understood that in many applications there are a plurality of separate openings 11 with a separate optical fiber 20 threaded through each opening 11. The packaging member may be a multiple-part substrate as in the above referenced related application Ser. No. 09/739,045 filed Dec. 18, 2000. The packaging member 10 may form part of a complete hermetic package, as is shown in FIG. 6. The packaging member 10 may typically be made of a vitreous or ceramic material, such as the glass-ceramic sold by Corning under the registered trademark MACOR. Normally such an optical fiber 20 will be either flush with a bottom surface 13 of the packaging member 10, or the optical fiber 20 protrudes into the package beyond the bottom surface 13 of the packaging member 10. The optical fiber 20 may be bonded to the sides (side walls) 12 of the opening 11 by an adhesive (bonding) material 30, which may be epoxy resin or other organic adhesives. Note that surfaces 31 of adhesive material 30 are exposed. This exposure is in an area surrounding an end 20A of the optical fiber 20. Since epoxy resins and other adhesive sealing materials tend to outgas, i.e., emit undesired components such as water, solvents used in the adhesive, and the like, after curing, such undesired components can enter a hermetic package (shown in FIG. 6), of which member 10 forms a portion, and cause deleterious effects.

The openings 11 in member 10 can be tapered and/or, can have a circular, diamond, triangular, or other geometric shape so long as a member, such as an optical fiber 20, can pass therethrough. An optical fiber 20 need not be centered through an opening 11 but can rest against one or more side walls of member 10 which define openings 11. In the case in which an optical fiber 20 comes in contact with a side wall of an opening 11, then an adhesive (bonding) material 30 would bond the optical fiber 20 to the side walls of an opening 11 which were not in contact with the optical fiber 20.

Figure 2:
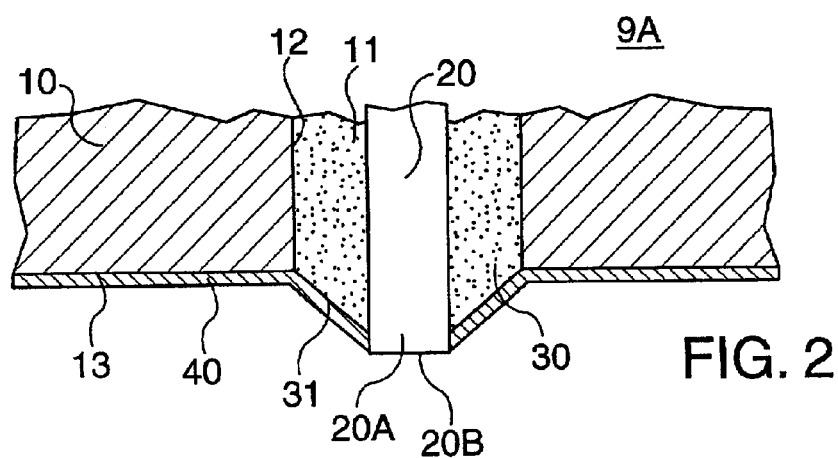
FIG. 2 shows a cross-sectional view of part of an optical fiber array in accordance with a first embodiment of the present invention.

FIG. 2 shows a cross-sectional view of a portion of an optical fiber array 9A in accordance with the present invention. Elements (components) of array 9A of FIG. 2 which are essentially identical to corresponding elements of array 9 of FIG. 1 have the same reference number. In array 9A exposed surfaces 31 of adhesive (bonding) material 30 are covered and sealed with a layer 40 of material which limits passage of any emitted undesired components from the adhesive material 30 into the interior of a hermetic package (shown in FIG. 6). The layer 40 may be of a single metal layer or a combination of metal layers, such as but not limited to aluminum, chromium, nickel, titanium, copper, tungsten, or gold, and is of sufficient thickness to block outgased materials from the adhesive material 30. Typical thicknesses for layer 40 to insure blocking of outgased components might be about 0.03 micrometer or greater. The layer 40 may be formed by initially metallizing the entire surfaces 13 and 31 and a bottom of the end 20A of optical fiber 20. A bottom surface 20B of the optical fiber 20 is then polished and the polishing is stopped before the surfaces 31 of adhesive material 30 are reached, to produce the structure of FIG. 2. This process is acceptable if the optical fiber is allowed to protrude beyond the surface 13 of packaging portion 10 when the polishing is complete.

If the fiber and the surface 13 of packaging member 10 need to be coplanar, it can be difficult to accurately control the polishing to leave the exposed adhesive surfaces 31 covered with layer 40 for sealing while polishing the optical fiber 20 flush with surface 13 of packaging portion 10.

Figure 3:
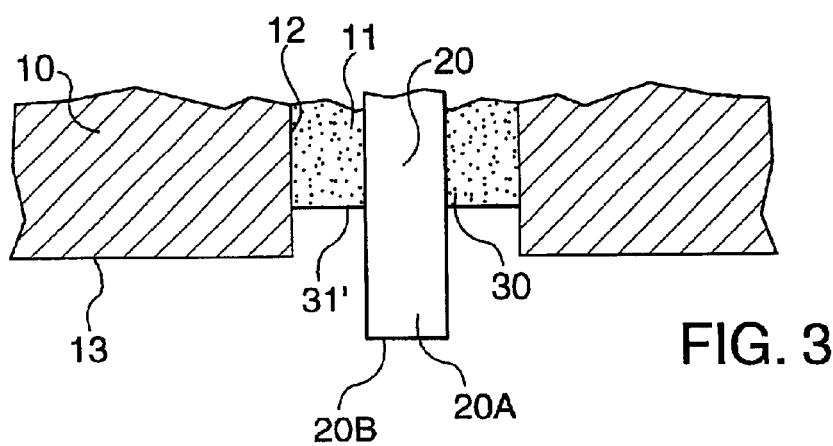
FIG. 3 illustrates a step in fabricating a second embodiment of the invention.
Figure 4:
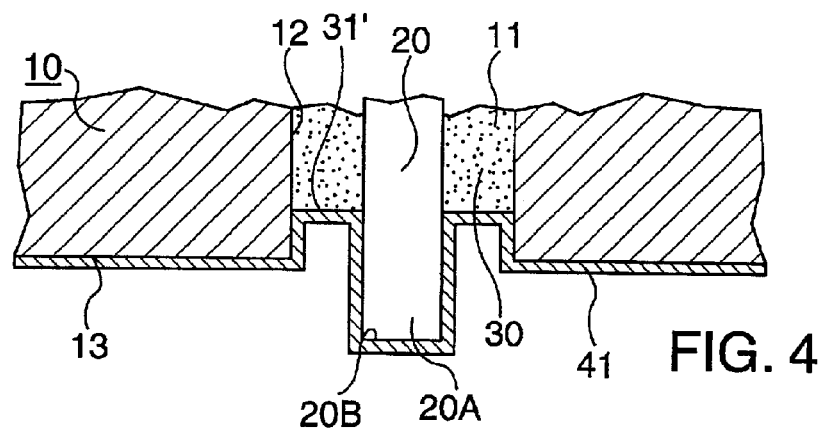
FIG. 4 shows a subsequent step in fabricating the second embodiment of the invention.
Figure 5:
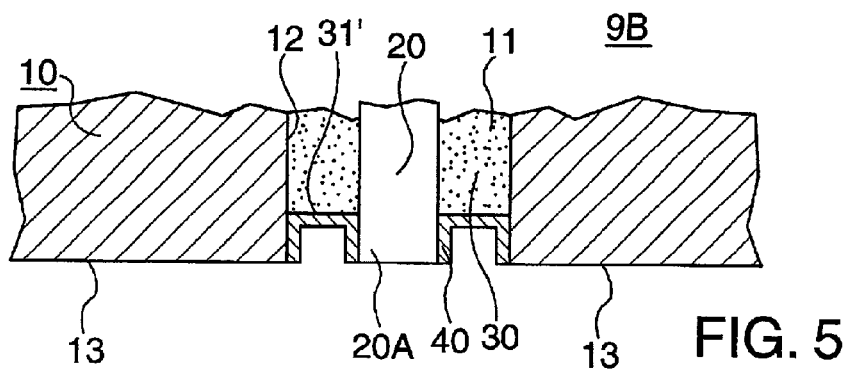
FIG. 5 shows a cross-sectional view of part of an optical fiber array in accordance with the second embodiment of the invention.

A preferred method of covering the exposed adhesive surface 31 while having an end of the optical fiber 20 flush with surface 13 of packaging portion 10 is shown in FIGS. 3, 4, and 5.

FIG. 3 shows a cross-sectional view of the optical fiber array 9 of FIG. 1 after a portion of the adhesive (bonding) material 30 has been removed, typically by using a selective etchant which removes some of the adhesive material 30 but essentially does not remove any of member 10 or optical fiber 20. In a typical example the adhesive material 30 is epoxy resin which can be wet chemical etched or plasma etched. This etching removes a portion of the adhesive material 30 to produce the cross-section shown in FIG. 3 in which the adhesive material 30 has a recess or relief below the surface 13 of the packaging member with the exposed portion being surface 31'. Typical etch depth could be 0.001 to 0.002 inch (25 to 50 micrometers), although this etch depth is not considered critical, so long as it is greater than the thickness of a layer 41 to be subsequently deposited. The layer 41 is selected to be of sufficient thickness to prevent (block) outgased components emitted from the adhesive material 30. Any excess adhesive (bonding) material 30 which covers portions of end 20A of optical fiber 20 can be removed during the forming of the recess below the surface 13 of the packaging member 10.

FIG. 4 shows the next step which is to coat the surfaces 13 and 31' and the end 20B of the optical fiber 20 with a layer 41, such as a single metal layer or a composite of two or more metal layers of chromium, copper, gold, titanium, tungsten, nickel, aluminum, or other metal. As previously, the thickness of such a layer 41 might be 0.03 micrometer or greater. The thickness of layer 41 should be sufficient to seal the adhesive (epoxy resin) surface and prevent the propagation of outgased materials from the adhesive. The metal layer 41 covers all exposed areas, including surfaces 13 of the packaging member, surfaces 31' of the recessed adhesive coating, and the end 20B of the optical fiber 20.

FIG. 5 shows the next step which is to polish the resulting structure until the end of optical fiber 20 is essentially coplanar with surface 13 of member 10 so as to form an optical fiber array 9B in accordance with the present invention. Depending on how much material is removed, portions of the metal layer 41 may or may not be removed from surface 13 during polishing.

The complete packaging member may be assembled to other elements to form a complete hermetic package, as is shown in FIG. 6. In FIG. 6 a plurality of optical fibers 20 are shown in a member 10. Each of the optical fibers 20 has been attached to side walls of openings in member 10 and had a sealing layer 40, 41 formed over all exposed surfaces as is shown in FIGS. 2, 4, and 5. As is indicated by the dashed vertical lines, packaging member 10 is sealed to an additional member 15, which additional member may define a cavity such as 16 (denoted by dashed lines) therein to receive active elements (not shown) such as semiconductor chips or optical components. Additionally, member 15 may have electrical connector elements (pins) 25 sealed therein and extending therethrough which can be inserted into a printed circuit board (not shown).

It will be appreciated and understood that the specific embodiments of the present invention described hereinabove are merely illustrative of the general principles of the present invention. Various modifications may be made by those skilled in the art which are consistent with the principles set forth. While the above embodiments illustrate sealing of an adhesive used to bond optical elements, such as optical fibers, into a portion of a hermetic package, it should be understood that the present invention has broader applications. Electrical connectors 25, such as electrical power supply terminals and electrical signal connectors, also must pass into the interior of hermetic packages, and must be bonded to the hermetic package. Use of adhesives such as epoxy resins to bond such electrical connectors to the sides of openings in hermetic package portions through which they must pass presents similar outgasing problems, which may be solved in the same manner. That is, an electrical connector passing through an opening in a hermetic package may be bonded to the sides of the opening with an adhesive such as epoxy resin, and exposed surfaces of the epoxy resin then sealed against outgasing by a sealing layer, in the same manner as for optical elements. The invention is thus applicable to both electrical and optical connector elements, and, as used herein, the expression connector elements is intended to include both optical connector elements, such as optical fibers or optical windows, and electrical connectors, such as signal leads or power supply leads.

Also, while the above embodiments employ a metal layer or layers, such as chromium, copper, gold, tungsten, titanium, nickel, or aluminum, as the sealing layer, other metals and other non-metal non-outgasing materials may also be used. In particular, electrically insulative materials such as silicon oxides or silicon nitride, may be employed. Such electrically insulative materials may be deposited by conventional methods such as chemical vapor deposition (CVD), sputtering, plasma deposition, or the like. When the connector being bonded to the housing portion and sealed against outgasing is an electrical connector, electrically insulative sealing materials may be used to avoid electrical shorting of the electrical connectors.

Also, while in the above embodiments, the bonding material which presents potential outgasing problems was illustrated as an organic adhesive, such as epoxy resin, it should be realized that other bonding materials may also present outgasing problems, and can be sealed against outgasing in the same manner. For example, use of metal solders for bonding connectors to hermetic package portions often involves use of fluxes, which can then lead to outgasing. Hence, a sealing layer may similarly be used with such fluxed solder bonding materials to restrain outgasing.

Also, while in the above examples, the housing is made of an insulative material such as the glass ceramic sold by Corning under the registered trademark MACOR, hermetic housings can also be made of other materials, such as glass, ceramics, or metals, and the present invention is equally applicable to any housing composition.

What is claimed is:

1. A process of sealing an optical element bonded to a support member using bonding material comprising the steps of:

placing an optical element through an opening in the support member with the cross-section of the opening being greater than the cross-section of the optical element and with the optical element projecting beyond said support member;

filling a space between said optical element and said support member with a bonding material which is prone to emit undesirable components;

removing a portion of said bonding material so as to leave said bonding material recessed below the surface of said support member;

coating said bonding material and the projecting portion of said optical element with a layer of material which is not prone to emitting undesirable components and which limits passage of any undesirable components emitted by said bonding material; and removing that portion of said layer of material which coats said projecting portion of said optical element while leaving that portion of said layer of material which coats said bonding material intact.

2. The process of claim 1 wherein said step of removing that portion of said layer of material which coats said projecting portion of said optical element also removes said projecting portion of said optical element to leave said optical element flush with the surface of said support member.

3. The process of claim 1 wherein said bonding material is epoxy resin.

4. The process of claim 1 wherein said sealing material is metal.

5. The process of claim 1 wherein said optical element is an optical fiber.

6. A process of sealing an optical fiber bonded to a support member with epoxy resin bonding material comprising the steps of:

placing an optical fiber through an opening in the support member which has a cross-section which is greater than the cross-section of the optical fiber such that there is a space between the optical fiber and the support member, and the optical fiber projects beyond a surface of said support member;

filling said space between said optical fiber and said support member with an epoxy resin bonding material which is prone to emit undesirable components;

removing a portion of said epoxy resin bonding material so as to leave said bonding material recessed below the surface of said support member;

coating said epoxy resin bonding material and the projecting portion of said optical fiber with a layer of material which layer limits passage of any undesirable components emitted by said epoxy resin bonding material; and removing that portion of said layer of material which coats said projecting portion of said optical fiber while leaving that portion of said layer of material which coats said bonding material intact and also removing said projecting portion of said optical element to leave said optical element flush with the surface of said support member.

7. A process of sealing an element bonded to a support member using epoxy resin bonding material comprising the steps of:

placing an element through an opening in the support member which has a cross-section which is greater than the cross-section of the element such that there is a space between the element and said support member, and the element projects beyond a surface of said support member;

filling said space between said element and said support member with an epoxy resin bonding material which is prone to emit undesirable components;

removing a portion of said epoxy resin bonding material so as to leave said bonding material recessed below the surface of said support member;

coating said epoxy resin bonding material and the projecting portion of said element with a layer of a sealing material which is not prone to emitting undesirable components and which limits passage of any undesirable components emitted by said epoxy resin bonding material; and removing that portion of said layer of sealing material which coats said projecting portion of said element while leaving that portion of said layer of sealing material which coats said bonding material essentially intact and also removing said projecting portion of said element to leave said element flush with the surface of said support member.

\* \* \* \* \*